(12) United States Patent
Ahn (10) Patent No.: US 9,608,375 B2
(45) Date of Patent: Mar. 28, 2017

(54) LAN PORT LOCK DEVICE

(71) Applicant: Chang Hoon Ahn, Gyeongsu-Daero (KR)

(72) Inventor: Chang Hoon Ahn, Gyeongsu-Daero (KR)

(73) Assignee: Chang Hoon Ahn, Anyang, Gyeonggi-do (KR)

( * ) Notice: Subject to any disclaimer, the term of this patent is extended or adjusted under 35 U.S.C. 154(b) by 0 days.

(21) Appl. No.: 15/163,999

(22) Filed: May 25, 2016

(65) Prior Publication Data

US 2016/0268734 A1 Sep. 15, 2016

Related U.S. Application Data

(63) Continuation of application No. PCT/KR2015/006315, filed on Jun. 22, 2015.

(30) Foreign Application Priority Data

Jul. 9, 2014 (KR) ........................ 10-2014-0086186

(51) Int. Cl.
*H01R 13/639* (2006.01)
*G06F 21/85* (2013.01)
(Continued)

(52) U.S. Cl.
CPC ............ *H01R 13/639* (2013.01); *G06F 21/85* (2013.01); *H01R 13/635* (2013.01); *H01R 24/64* (2013.01); *H01R 2107/00* (2013.01)

(58) Field of Classification Search
CPC ............ H01R 13/6272; H01R 13/6275; H01R 13/639; H01R 13/6392; H01R 13/6395
(Continued)

(56) References Cited

U.S. PATENT DOCUMENTS 5,584,718 A * 12/1996 Sukegawa .......... H01R 13/6272
439/352
5,951,317 A * 9/1999 Tracy ................. H01R 13/6275
439/352

(Continued)

*Primary Examiner* — Gary Paumen
(74) *Attorney, Agent, or Firm* — Mintz Levin Cohn Ferris Glovsky and Popeo, P.C.; Kongsik Kim (57) ABSTRACT

Disclosed is a LAN port lock device for selectively locking a LAN port connector, having a resilient hook that is locked and coupled inside a LAN port of an electronic device when inserted into the LAN port, so as not to be separated when in the state coupled to the LAN port. The LAN port lock device is characterized by including: a device main body through which a LAN port connector passes and is coupled, and which, upon being coupled, has the terminal portion of the LAN port connector projecting outward therefrom; a locking unit coupled to the device main body, for selectively impeding and allowing the resilient deformation of the resilient hook of the LAN port connector coupled to the device main body by inhibiting or being separated from the resilient hook, according to the position to which the connector has moved; and a release button installed to be capable of being inserted in and extruded from the device main body, so as to interfere with and resiliently deform the resilient hook when inserted into the device main body in a state in which the resilient hook is separated from the locking unit.

14 Claims, 11 Drawing Sheets

(51) Int. Cl.
*H01R 13/635* (2006.01)
*H01R 24/64* (2011.01)
*H01R 107/00* (2006.01)

(58) Field of Classification Search
USPC .................................................. 439/352, 489
See application file for complete search history.

(56) References Cited

U.S. PATENT DOCUMENTS

| | | | | |
|---|---|---|---|---|
| 6,450,830 B1* | 9/2002 | Koseki | ............... | H01R 13/6275 |
| | | | | 439/352 |
| 6,457,987 B1* | 10/2002 | Yeh | .................... | H01R 13/6275 |
| | | | | 439/352 |
| 7,311,544 B1* | 12/2007 | Berta | ..................... | H01R 24/62 |
| | | | | 439/344 |
| 7,428,834 B1* | 9/2008 | Lee | ......................... | E05B 67/36 |
| | | | | 439/133 |
| 2005/0245122 A1* | 11/2005 | Fisher | ................ | H01R 13/6272 |
| | | | | 439/352 |
| 2010/0112845 A1* | 5/2010 | Lam | ................... | H01R 13/6275 |
| | | | | 439/352 |

\* cited by examiner

LAN PORT LOCK DEVICE

CROSS-REFERENCE TO RELATED APPLICATIONS

This is a continuation application of International Application No. PCT/KR2015/006315 filed on Jun. 22, 2015, which claims priority to Korean Application No. 10-2014-0086186 filed on Jul. 9, 2014. The applications are incorporated herein by reference.

TECHNICAL FIELD

The present invention relates to a LAN port lock device and, more particularly, to a LAN port lock device that can safely lock a LAN port connector connected to a LAN cable to a LAN port.

BACKGROUND ART

With industrial and technical development, electronic devices such as a computer have been rapidly spread and most organizations including companies and government offices conduct relevant business using electronic devices such as a server computer, a personal computer (including a notebook), a tablet PC, and a mobile device. Further, electronic devices have been used for control and management in various other fields such as mechanical and factorial facilities, industrial facilities, and military facilities.

As industry is reorganized to incorporate the use of electronic devices having computer functions, damage to electronic devices or leakage of important information is frequently caused by malicious codes or viruses that are intentionally spread into the electronic devices.

In consideration of this situation, various measures have been developed and are used in government and municipal offices, companies, and military facilities to prevent leakage of information and to provide protection from viruses etc. However, recently, as general-purpose USB ports that allow quick access to a computer have been widely used with development of memory devices, it frequently occurs that third parties can easily accesses a main computer and put viruses into the computer or take out important information.

That is, most computers on the market now have at least one general-purpose USB port that allows easy access to the computer, so anybody can easily access desired computers by connecting a USB memory to a USB port.

Accordingly, unauthorized users can easily connect a USB memory to a computer and put a virus into the computer or take out important information, so there is a need for measurements against this problem.

In consideration of the problem, the applicant(s) has proposed a USB lock device that can prevent connection of unauthorized memories when a USB memory is connected to a USB port.

However, many electronic devices also have a LAN port for connection via wire to provide internet or telephone communication, and a LAN connector connected to a LAN cable is supposed to the connected to the LAN port, so external electronic devices or memories can be connected to the LAN ports. Accordingly, it is strongly required to develop a device that can safely lock the LAN ports.

SUMMARY

The present invention has been made in consideration of the problems and an object of the present invention is to provide a LAN port lock device that can lock a LAN connector connected to a LAN port of an electronic device.

In order to achieve the object, the present invention provides a LAN port lock device for selectively locking a LAN port connector having a flexible hook that is locked into a LAN port of an electronic device, when the LAN port connector is inserted in the LAN port, the LAN port lock including: a device body where the LAN port connector is inserted with a terminal exposed outside; a locking unit coupled to the device body and selectively preventing or allowing for elastic deformation of a flexible hook of the LAN port connector coupled to the device body by interfering with or separating from the flexible hook in accordance with positions; and a release button provided to move into and out of the device body and elastically deforming the flexible hook being separated from the locking unit and inserted into the device body.

The device body may have a structure with both ends open and may have a first compartment where the locking unit is coupled and a second compartment that communicates with the first compartment and that the LAN port connector is inserted through.

The locking unit may include: a fixing housing fixed in the first compartment and being open at both ends; and a locking member disposed to reciprocate in the fixing housing, interfering with the flexible hook when being inserted into the fixing housing, and allowing for deformation of the flexible hook when being pulled out of the fixing housing.

The locking member may include a frame disposed to move in the fixing housing and an internal structure inserted inside the frame and having a key groove at a first end, and a space where the flexible hook enters is defined between a second end of the internal structure and the frame.

The release button may move into and out of the first compartment.

A pair of separation walls may be formed between the first and second compartments to face each other with a gap therebetween on inner sides facing each other of the device body.

A projection corresponding to a groove on a side of the LAN port connector may be formed on a bottom inside the second compartment to fix the LAN port connector inserted in the second compartment.

According to the LAN port lock device of the present invention, when the LAN port connector is coupled to a LAN port, it is impossible to unlock a flexible hook of a LAN port connector without using a specific release key that only a manager possesses, thereby only authorized persons can separate the LAN port connector from the LAN port.

Accordingly, it is possible to ensure data safety in an electronic device connected to a LAN cable against intruders.

DETAILED DESCRIPTION

A LAN port device according to an embodiment of the present invention is described hereafter with reference to the accompanying drawings.

Referring to FIGS. 1 to 11, a LAN port lock device 100 according to an embodiment of the present invention is a device for keeping a LAN port connector 20 at an end of a LAN cable 10 locked to a LAN port 40 at an electronic device 30 before a release key is used.

Figure 9:
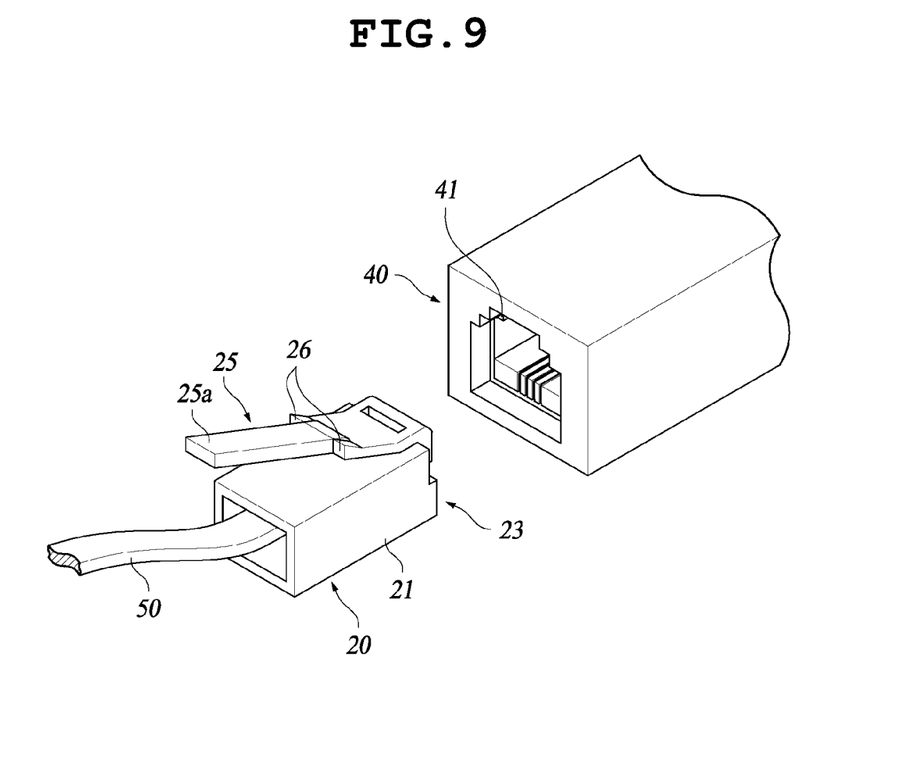
FIG. 9 is a view showing a common LAN port connector and LAN port.

The LAN port connector 20 has a standardized shape to be coupled to the common standardized LAN port 40. In detail, as shown in FIG. 9, the LAN port connector 20 has a connector body 21 to which a cable 50 is connected, a connection terminal 23 exposed at a side of the connector body 21, and a flexible hook connected to the connector body 21 and elastically transforming and restoring.

The flexible hook 25 is connected to the connector body 21 at a first end and has elasticity so that when a user presses and then releases a second end that is a free end 25a, it returns to the initial position. Hooking portions 26 that are locked to a locking step 41 inside the LAN port 40 are formed at both sides of the flexible hook 25. When the LAN port connector 20 having this configuration is pushed into the LAN port 40, the flexible hook 25 is elastically pressed in contact with the inside of the LAN port 40 at the early stage and is then elastically restored and the hooking portions 26 are locked to the locking step 41 inside the LAN port 40 after the LAN port connector 20 is fully inserted, so the LAN port connector 20 cannot be freely pulled out from the LAN port 40. In order to separate the LAN port connector 20 from the LAN port 40, a user presses the free end 25a of the flexible hook 25 toward the connector body 21 and then pulls the LAN port connector 20 out of the LAN port 40 with the free end 25a pressed. That is, when the free end 25a of the flexible hook 25 is elastically pressed down to the connector body 21, the hooking portions 26 of the flexible hook 25 are unlocked from the locking step 41 inside the LAN port 40, so the LAN port connector 20 can be pulled out of the LAN port 40.

Figure 1:
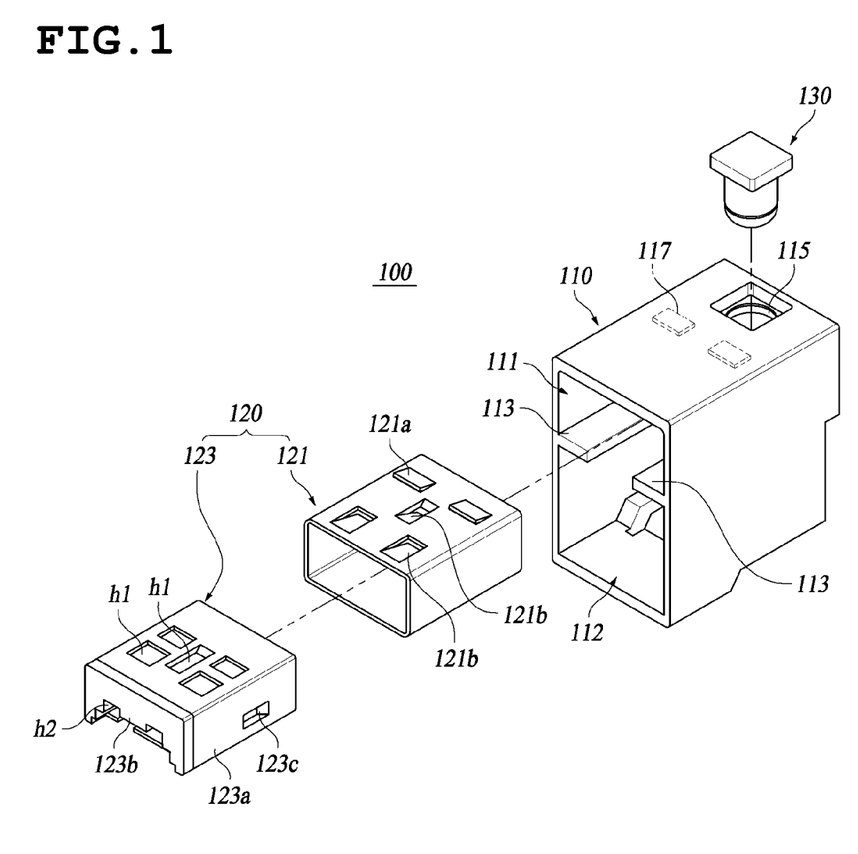
FIG. 1 is an exploded perspective view showing a LAN port lock device according to an embodiment of the present invention.
Figure 2:
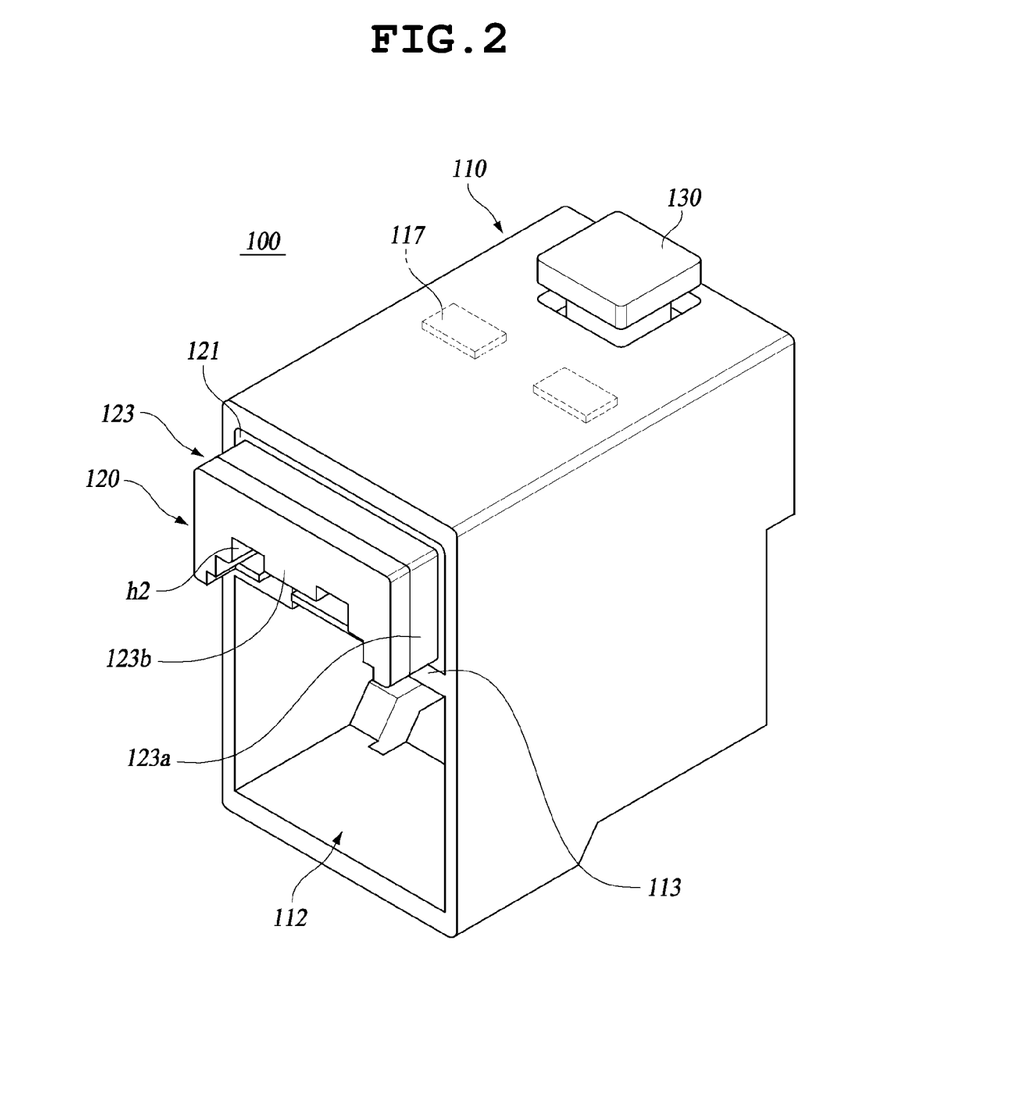
FIG. 2 is a perspective assembly view of the LAN port lock device shown in FIG. 1.
Figure 3:
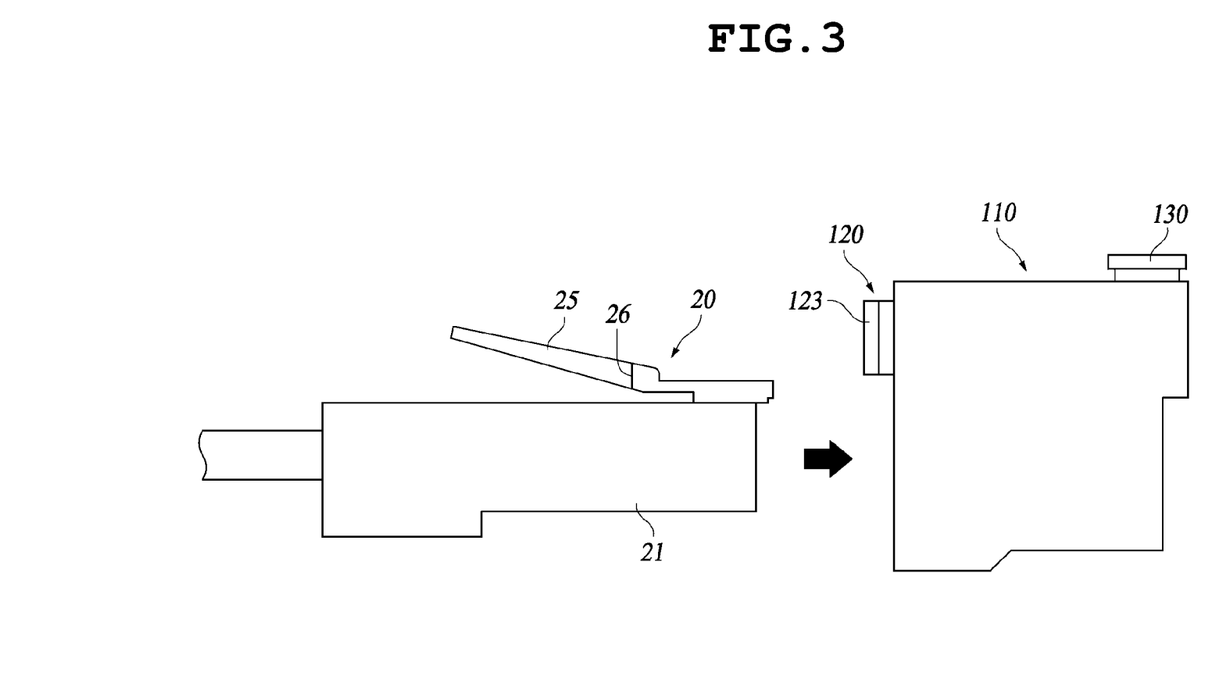
FIG. 3 is a side view showing the LAN port lock device shown in FIG. 2 and a LAN port connector.

The LAN port lock device 100 according to an embodiment of the present invention has a device body 110, a locking unit 120 coupled to the device body 110, and a release button 130 in the device body 110.

The device body 110 is a case having an internal space with two sides open and the internal space is divided into a first compartment 111 and a second compartment 112 by separation walls 113. The locking unit 120 is disposed in the first compartment 111 and the LAN port connector 20 that is coupled to the LAN port 40 is inserted into the second compartment 112. A pair of separation walls 113 may be formed with a gap therebetween on sides facing each other in the device body 110. Accordingly, the first and second compartment 111 and 113 can communicate with each other through the space between the separation walls 113 and the flexible hook 25 of the LAN port connector 20 can pass through the space without interference.

A button hole 115 for guiding the release button 130 is formed through the device body 110 to communicate with the first compartment 111.

Figure 5:
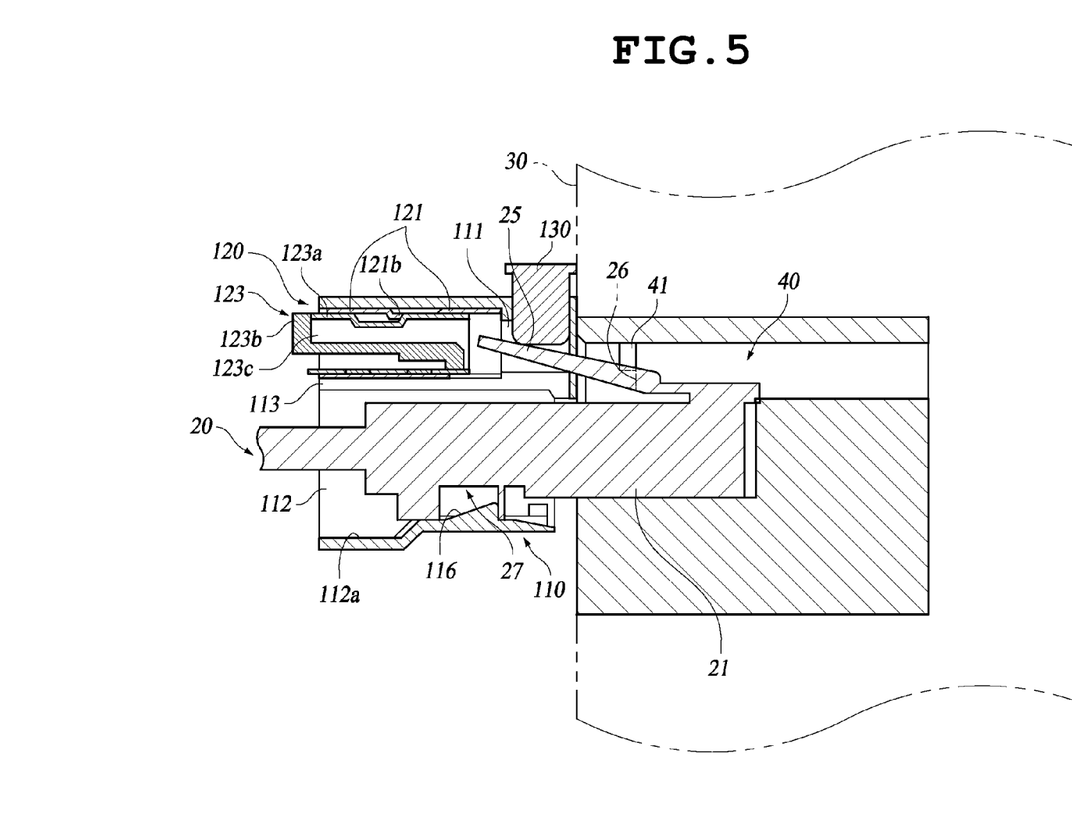

A projection 116 is formed on the bottom inside the second compartment 112 to correspond to a groove 27 formed at the LAN port connector 20. The projection 116 is inclined gradually upward in the insertion direction of the LAN port connector 20. When the projection 116 is fitted in the groove 27, as shown in FIG. 5, it supports the LAN port connector 20 inserted in the second compartment 112 so that the LAN port connector 20 is kept at the position.

As described above, when the LAN port connector 20 is inserted in the second compartment 112, the free end 25a of the flexible hook 25 is positioned inside the first compartment 111, in detail, the flexible hook 25 is positioned under the release button 130 and the free end 25a is positioned inside the locking unit 120.

The locking unit 120 includes a fixing housing 121 inserted in the first compartment 111 and a locking member 123 capable of reciprocating in the fixing housing 121.

The fixing housing 121 has the shape of a rectangular frame with both ends open and is inserted and fixed in the first compartment 111. The fixing housing 121 has a plurality of fixing flaps 121a that is formed by cutting predetermined portions of the fixing housing 121 and protrudes outward to prevent the fixing housing 121 from coming out of the first compartment 111. The fixing housing 121 further has one or more ribs 121b that are formed by cutting predetermined portions of the fixing housing 121 and protrude inward to guide the locking member 120 reciprocating and prevent the locking member 123 from fully separating. Fixing grooves 117 where the fixing flaps 121a are fitted are formed on the top inside the first compartment 111 to keep the fixing housing 121 in the first compartment 111.

Figure 10:
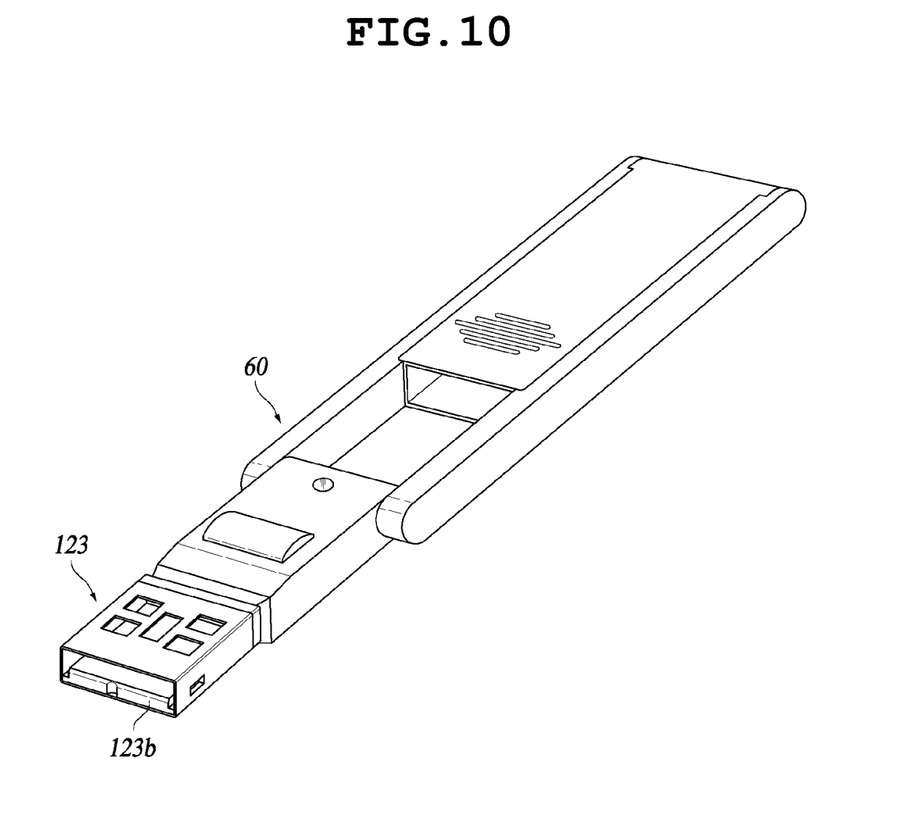
FIGS. 10 and 11 are views illustrating a release key.
Figure 11:
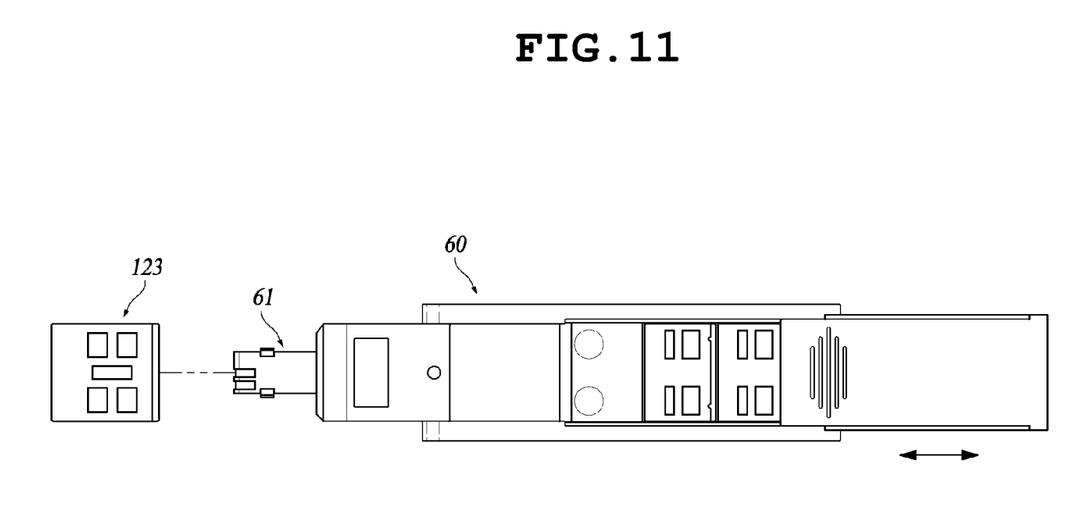

The fixing member 123 has an external frame 123a and an internal structure 123b disposed inside the frame 123a. Guide holes h1 corresponding to the ribs 121b are formed at the frame 123a and fixing projections 123c protruding inward are formed on sides of the frame 123a to fix the internal structure 123b. The internal structure 123b is inserted and fixed inside the frame 123a with an end exposed outside the frame 123a. Key grooves h2 having a predetermined shape are formed at the exposed end of the internal structure 123b. After the locking member 123 having this configuration is inserted in the fixing housing 121, as shown in FIGS. 10 and 11, it is possible to pull the locking member 123 out of the fixing housing 121 only using a release key 60. That is, it is possible to pull the locking member 123 out of the fixing housing 121 to a predetermined distance only by inserting a key portion 61 into the key grooves h2 and pulling the release key 60.

The detailed configuration for pulling the fixing member 123 out of the fixing housing 121 using the release key 60 will be easily understood from Korean Patent No. 10-1291975 by the applicant(s), so it is not described herein.

The release button 130 can vertically move into and out of the first compartment 111 of the device body 110, in detail, the release button 130 can vertically move over the flexible hook 25 of the LAN port connector 20 coupled to the device body 110. A spring (not shown) may be disposed in the device body 110 to push the release button 130 outside.

Figure 7:
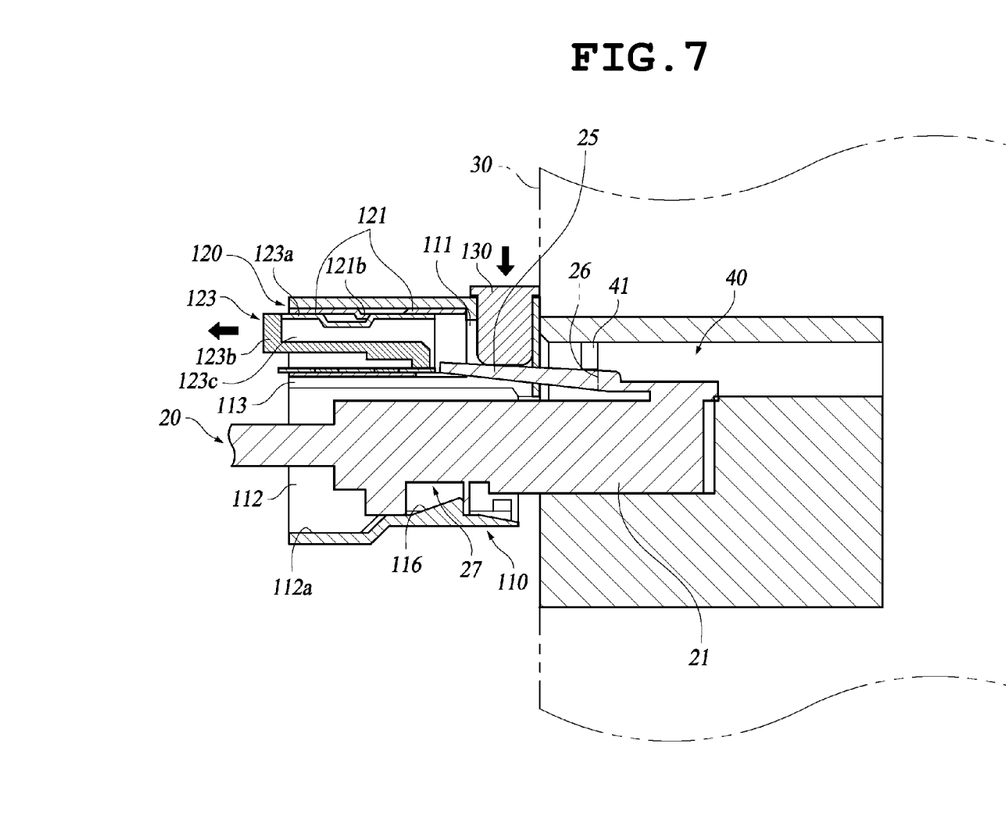
Figure 8:
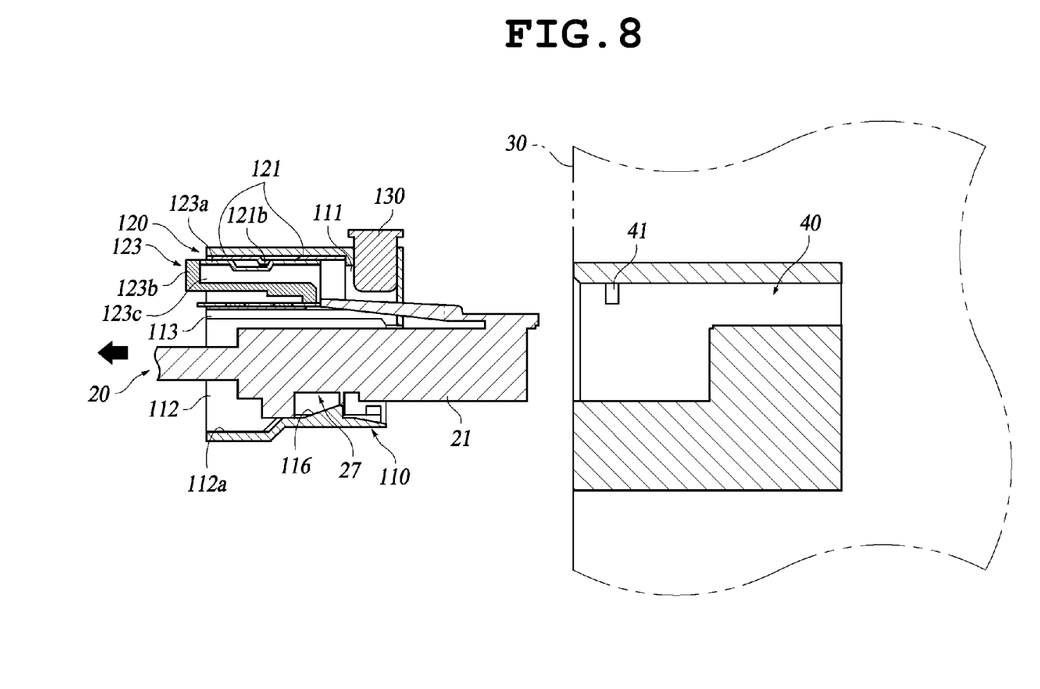

According to this configuration, as in FIG. 5, when the release button 130 is pressed with the locking member 123 exposed outside the fixing housing 121, the flexible hook 25 is elastically pressed by the release button 130, as shown in FIG. 7, and accordingly the LAN port connector 20 can be separated from the LAN port 40.

Figure 6:
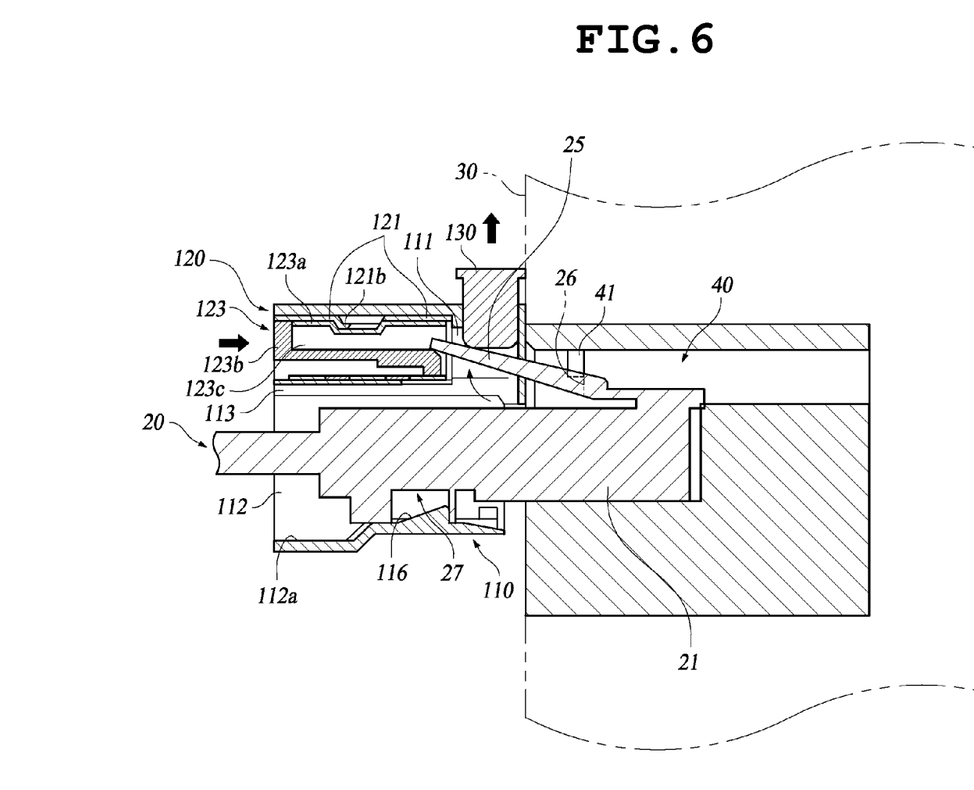

However, when the locking member 123 is inserted in the fixing housing 121, as in FIG. 6, the flexible hook 25 is positioned in the space 123c between the internal structure 123b and the frame 123a of the locking member 123, so the flexible hook 25 cannot be pressed by the release button 130. That is, the free end 25a of the flexible hook 25 is supported by the internal structure 123b, so it is not pressed by the release button 130. Accordingly, the LAN port connector 20 coupled to the LAN port 40 cannot be separated in this state. That is, in order to separate the LAN port connector 20 from the LAN port 40, it is required to pull the locking member 123 out of the fixing housing 121 by a predetermined distance using the release key 60 so that the flexible hook 25 can be deformed.

Operational effects of the LAN port lock device 100 according to an embodiment of the present invention having the configuration described above are described in detail hereafter.

Figure 4:
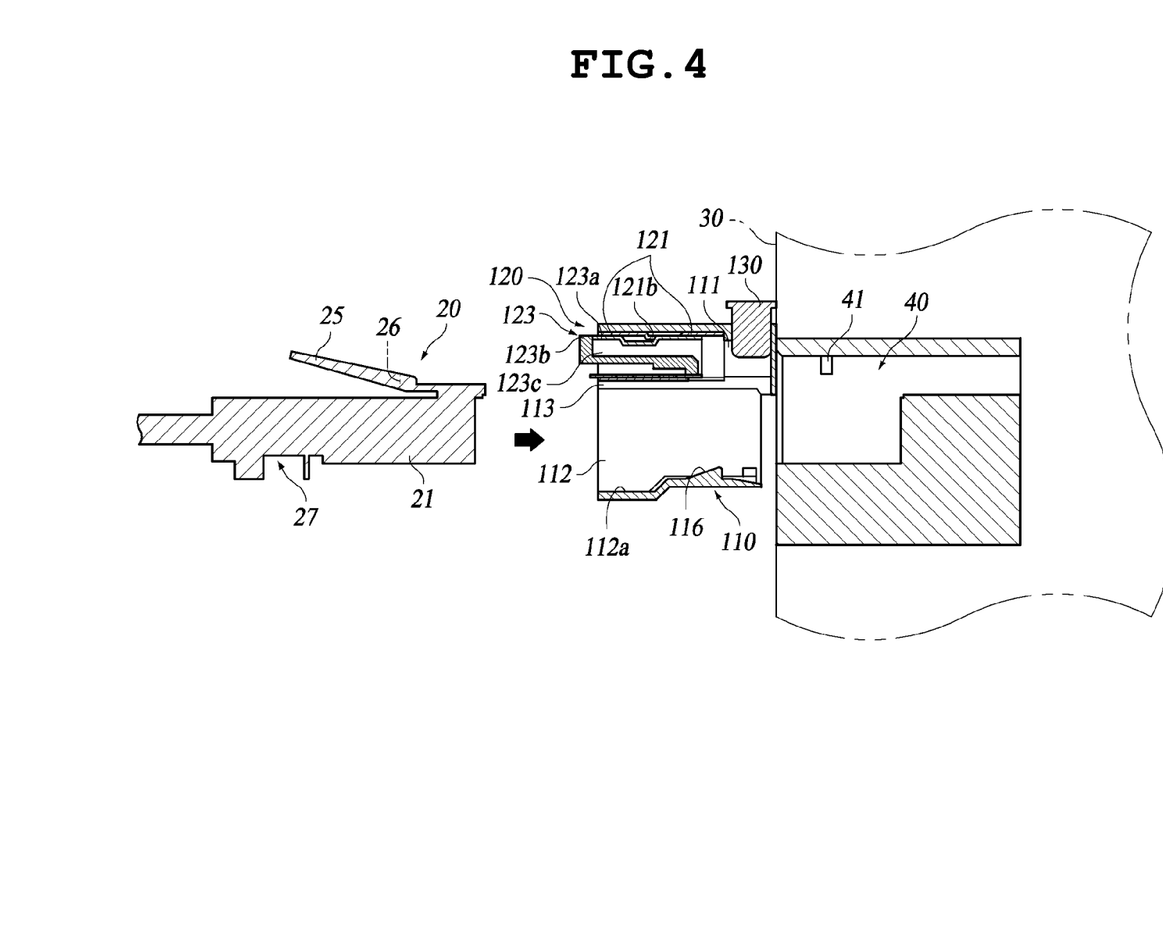
FIGS. 4 to 8 are views showing connecting and disconnecting a LAN port connector to and from a LAN port using the LAN port lock device shown in FIG. 1.

First, as shown in FIG. 4, the LAN port lock device 100 of the present invention is placed to correspond to the LAN port 40. In this state, an end of the locking member 123 protrudes outside. In this state, the LAN port connector 20 is inserted into the second compartment 112 of the device body 110 and then further inserted into the LAN port 40, as in FIG. 5. Accordingly, the elastic hook 25 of the LAN port connector 20 is locked in the LAN port 40.

With the LAN port connector 20 coupled to the LAN port 40, the locking member 123 is pushed into the fixing housing 121, as in FIG. 6.

Accordingly, as described above, the internal structure 123b of the locking member 123 supports the free end 25a of the flexible hook 25, so even though the release button 130 is pressed, the elastic hook 25 is not pressed, and accordingly, the LAN port connector 20 cannot be separated from the LAN port 40.

In order to separate the LAN port connector 20, a manager who has the release key 60 pulls the locking member 123 out of the fixing housing 121 using the release key 60, as in FIG. 7. In this state, when the release button 130 is pressed, the flexible hook 25 is pressed by the release button 130 and unlocked from the LAN port 40. Accordingly, the manager can separate the LAN port connector 20 from the LAN port 40 by pulling the device body 110 with the release button 130 pressed, as in FIG. 8.

As described above, when the LAN port connector 20 is coupled to the LAN port 40 of an electronic device etc. by the LAN port lock device 100 of the present invention, it is impossible to separate the LAN port connector 20 from the LAN port 40 without using the release key 60 that a manager has. Therefore, it is impossible for an intruder or an unauthorized person to connect a LAN port connector to the LAN port 40, so it is possible to ensure data safety in an electronic device.

Although the present invention was described above with reference to an embodiment and the drawings, the present invention is not limited to the configuration and operation described above and shown in the drawings. Those skilled in the art may understand that the present invention may be modified and changed in various ways without departing from the spirit and scope of the present invention which are described in claims.

<Description of the Reference Numerals in the Drawings>

| | |
|---|---|
| 20: LAN port connector | 21: Connector body |
| 25: Flexible hook | 40: LAN port |
| 60: Release key | 100: LAN port lock device |
| 110: Device body | 120: Locking unit |
| 121: Fixing housing | 123: Locking member |
| 130: Release button | |

The invention claimed is:

1. A LAN port lock device for selectively locking a LAN port connector having a flexible hook that is locked into a LAN port of an electronic device, when the LAN port connector is inserted in the LAN port, the LAN port lock comprising:
   a device body where the LAN port connector is inserted with a terminal exposed outside;
   a locking unit coupled to the device body and selectively preventing or allowing elastic deformation of a flexible hook of the LAN port connector coupled to the device body by interfering with or separating from the flexible hook configured to be inserted and retracted from the device body; and
   a release button configured to be inserted and retracted from the device body and elastically deform the flexible hook to separate the flexible hook from the locking unit and insert the flexible hook into the device body.

2. The LAN port lock device of claim 1, wherein a projection corresponding to a groove on a side of the LAN port connector is formed on a bottom inside the second compartment to fix the LAN port connector inserted in the second compartment.

3. The LAN port lock device of claim 1, wherein the device body has a structure with both ends open, has a first compartment where the locking unit is coupled, and has a second compartment that communicates with the first compartment and that the LAN port connector is inserted through.

4. The LAN port lock device of claim 3, wherein a pair of separation walls is formed between the first and second compartments to face each other with a gap therebetween on inner sides facing each other of the device body.

5. The LAN port lock device of claim 3, wherein a projection corresponding to a groove on a side of the LAN port connector is formed on a bottom inside the second compartment to fix the LAN port connector inserted in the second compartment.

6. The LAN port lock device of claim 3, wherein the locking unit includes:
   a fixing housing fixed in the first compartment and being open at both ends; and
   a locking member disposed to reciprocate in the fixing housing, interfering with the flexible hook when being inserted into the fixing housing, and allowing for deformation of the flexible hook when being pulled out of the fixing housing.

7. The LAN port lock device of claim 6, wherein a pair of separation walls is formed between the first and second compartments to face each other with a gap therebetween on inner sides facing each other of the device body.

8. The LAN port lock device of claim 6, wherein a projection corresponding to a groove on a side of the LAN port connector is formed on a bottom inside the second compartment to fix the LAN port connector inserted in the second compartment.

9. The LAN port lock device of claim 6, wherein the locking member includes a frame disposed to move in the fixing housing and an internal structure inserted inside the frame and having a key groove at a first end, and
   a space where the flexible hook enters is defined between a second end of the internal structure and the frame.

10. The LAN port lock device of claim 9, wherein a pair of separation walls is formed between the first and second compartments to face each other with a gap therebetween on inner sides facing each other of the device body.

11. The LAN port lock device of claim 9, wherein a projection corresponding to a groove on a side of the LAN port connector is formed on a bottom inside the second compartment to fix the LAN port connector inserted in the second compartment.

12. The LAN port lock device of claim 3, wherein the release button moves into and out of the first compartment.

13. The LAN port lock device of claim 12, wherein a pair of separation walls is formed between the first and second compartments to face each other with a gap therebetween on inner sides facing each other of the device body.

14. The LAN port lock device of claim 12, wherein a projection corresponding to a groove on a side of the LAN port connector is formed on a bottom inside the second compartment to fix the LAN port connector inserted in the second compartment.

* * * * *